United States Patent [19]

Nemoto

[11] Patent Number: 4,629,352
[45] Date of Patent: Dec. 16, 1986

[54] RESILIENT BALL AND SOCKET JOINT ASSEMBLY AND METHOD OF MANUFACTURE

[75] Inventor: Akira Nemoto, Toyohashi, Japan
[73] Assignee: Mushashi Seimitsu Kogyo Kabushiki Kaisha, Aichi, Japan
[21] Appl. No.: 761,040
[22] Filed: Jul. 31, 1985
[30] Foreign Application Priority Data Aug. 10, 1984 [JP] Japan .................... 59-168713

[51] Int. Cl.$^4$ .......................................... F16C 11/06
[52] U.S. Cl. ................... 403/128; 403/131; 403/132; 403/135; 403/267
[58] Field of Search ........... 403/90, 122, 128, 130, 403/131, 132, 133, 134, 135, 136, 137, 140, 139, 267; 156/305; 29/264, 446; 264/261, 242

[56] References Cited

U.S. PATENT DOCUMENTS

| | | | |
|---|---|---|---|
| 2,077,582 | 4/1937 | Peo | 403/131 X |
| 2,328,330 | 8/1943 | Edington . | |
| 2,885,235 | 5/1959 | Moskovitz | 403/131 |
| 2,970,853 | 2/1961 | Baker | 403/90 |
| 3,097,005 | 7/1963 | Fickler | 403/140 X |
| 3,290,073 | 12/1966 | Gottschald | 403/132 X |
| 3,363,921 | 1/1968 | Gottschald | 403/131 X |
| 3,495,858 | 2/1970 | Kindel . | |
| 3,537,734 | 11/1970 | Gottschald et al. | 403/139 X |

Primary Examiner—Cornelius J. Husar
Assistant Examiner—Joseph A. Fischetti
Attorney, Agent, or Firm—Ladas & Parry

[57] ABSTRACT

A joint housing has mounted therein a bearing supporting a ball portion of a ball stud, extending outwardly therefrom, so as to allow angular displacement thereof. The ball portion comprises a greater diameter portion of the ball stud, such as a sphere-segmental head on its extreme end, and a sphere-segmental shell coaxially surrounding the ball stud with a spacing therebetween. The shell has an inturned annular rim at one end thereof in an opposed relation to an annular shoulder provided by the head of the ball stud. A one-piece elastomeric bushing is injection molded in place between the ball stud and the shell. Part of the bushing further fills the annular gap between the shoulder of the ball stud and the inturned rim of the shell. Preferably prestressed, this part of the bushing serves to prevent the development of looseness with the progress of wear and further to minimize the axial displacement of the ball stud relative to the joint housing under load.

12 Claims, 7 Drawing Figures

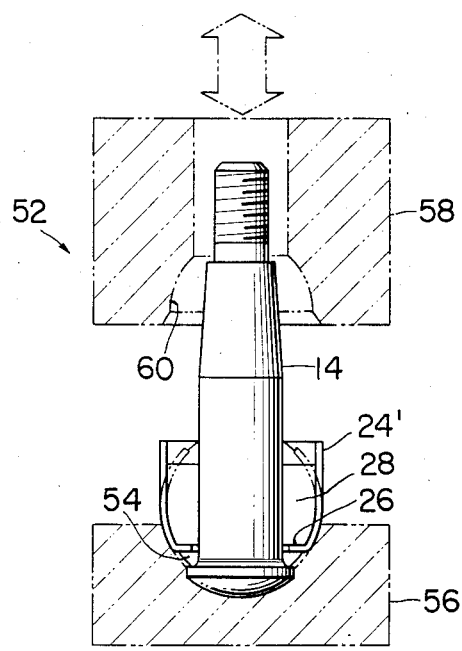
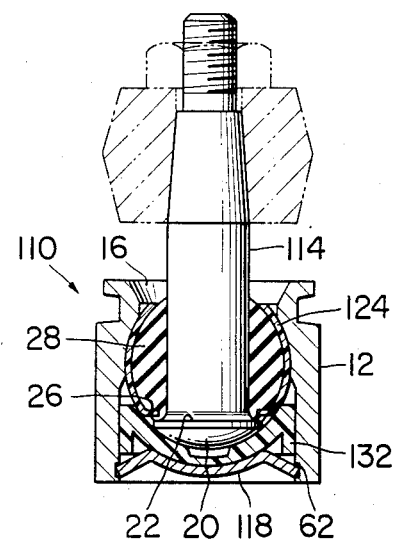
FIG. 5        FIG. 6
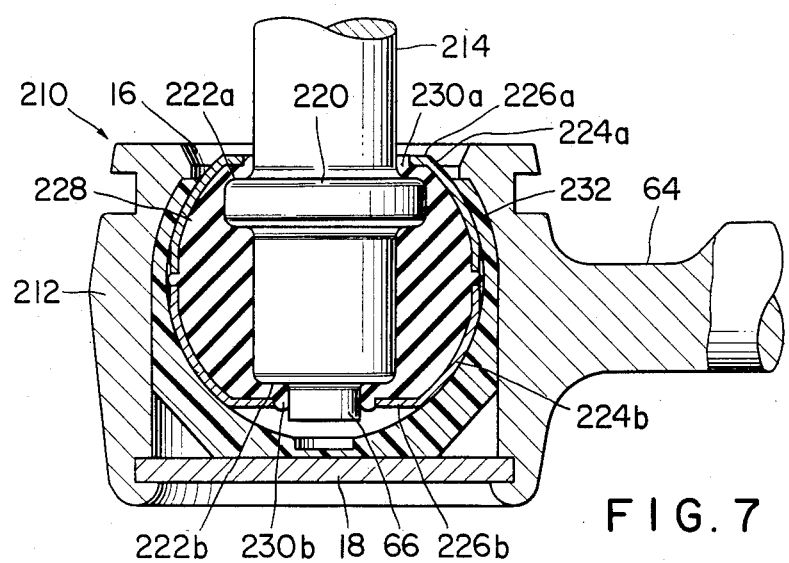
FIG. 7

RESILIENT BALL AND SOCKET JOINT ASSEMBLY AND METHOD OF MANUFACTURE

BACKGROUND OF THE INVENTION

This invention relates to universal joints and especially to ball and socket joint assemblies of generally resilient construction suitable for use in automotive suspensions, steering linkages, and like applications in which considerable vibratory or impulsive loading must be tolerated. The invention is also specifically directed to a method of fabricating such ball and socket joint assemblies.

A variety of joint constructions for the above stated applications have been suggested, among them being those described and claimed in U.S. Pat. Nos. 2,328,330 to Edington, 2,970,853 to Baker, and 3,495,858 to Kindel. These prior art devices are more or less akin in that the ball end of a ball stud is provided with a bushing or bushings of rubber or like material to be resiliently supported in a housing or socket member. The rubber bushing or bushings are intended to absorb vibrations or impacts that may be applied to the joints in service.

A drawback common to the above conventional rubber bushed joints is that the ball stud and socket member are susceptible to too much axial displacement relative to each other under tensile load because of the easy elastic deformation of the bushing or bushings. The relative displacements of the ball stud and socket member under compressive and lateral loads are also objectionably great. These weaknesses of the known devices have earned them little commercial acceptance except in very much limited fields of applications.

SUMMARY OF THE INVENTION

The present invention provides a simple and readily practicable remedy to the problem of how to limit, in a ball and socket joint assembly of the type under consideration, the relative displacement of the ball stud and joint housing in various directions.

According to the invention, stated briefly in one aspect thereof, a ball and socket joint construction is provided which comprises a ball stud extending into a joint housing through its open end. The ball stud has a greater diameter portion, disposed within the housing, which provides an annular shoulder around the stud. Also disposed within the housing is a shell which is shaped like a segment of a sphere and which coaxially and loosely surrounds the ball stud. The shell has at one axial end thereof an inturned rim which is opposed to the shoulder of the ball stud in the axial direction of the latter. The ball stud and shell of the above relative placement are substantially integrally joined to each other via a one-piece bushing of an elastomer or like material filling not only the space between the ball stud and the shell but also the gap between the shoulder of the ball stud and the inturned rim of the shell. Also included is a bearing supporting the ball stud within the housing so as to allow the angular displacement of the ball stud relative to the housing.

According to another aspect of the invention, there is provided a method of fabricating a ball and socket joint assembly of the foregoing construction. The method dictates the molding of the one-piece bushing in place between the ball stud and the bushing while these two members are being held in the above stated relative positions as in a molding machine. An elastomer is introduced into the space between stud and shell and into the gap between stud houlder and shell rim. After having been thus joined together via the elastomeric bushing, the ball stud and shell may be mounted, together with the bearing, in place within the joint housing.

The ball and socket joint assembly of this invention particularly features the filling, with part of the one-piece elastomeric bushing, of the gap between the shoulder of the ball stud and the rim of the shell which are opposed to each other in the axial direction of the joint. This improved construction results in a marked decrease in the relative axial displacement of the ball stud and joint housing under tensile load. Further, as the inturned rim of the shell has its inner edge located very close to the circumference of the ball stud, the relative lateral displacement of the ball stud and joint housing can also be reduced. These results are obtained, moreover, without in any way impairing the desired joint property of absorbing vibratory and impulsive forces.

It will also be appreciated that the joint assembly of this invention is very easy of manufacture. The ball stud itself need not be of any extraordinary configuration; only the shell has one of its ends turned inwardly to provide the annular rim. The joint assembly of this improved construction can be fabricated much more easily and inexpensively than those employing ball studs of intricate shape.

Preferably, at least that part of the elastomeric bushing which fills the gap between the shoulder of the ball stud and the inturned rim of the shell should be precompressed in the axial direction of the ball stud. Then this part of the bushing will serve the additional purpose of wear takeup, preventing looseness despite the wear of the joint assembly in use. The bushing part in question will be readily prestressed as the ball stud and shell are moved axially with respect to each other after filling the elastomer therebetween.

The above and other features and advantages of this invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIG. 5 is a diagrammatic illustration of a press which can also be employed for the fabrication of the joint assembly of FIGS. 1 through 3;

FIG. 6 is an axial section through an alternative form of the joint assembly in accordance with the invention; and FIG. 7 is an axial section through another alternative form of the joint assembly in accordance with the invention.

DESCRIPTION OF THE PREFERRED EMBODIMENTS

Figure 1:
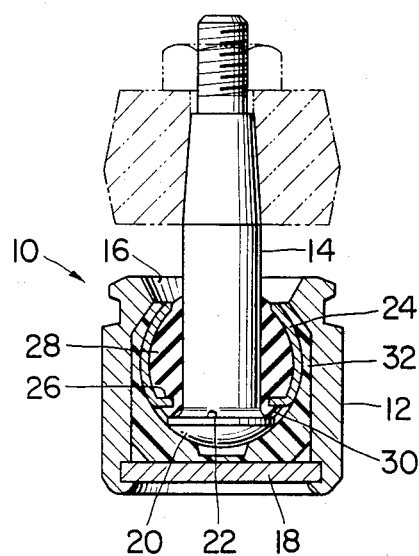
FIG. 1 is an axial section through the ball and socket joint assembly constructed in accordance with the present invention.

The invention will now be described in terms of the ball and socket joint assembly 10 of FIG. 1 which represents the first preferred embodiment of the invention. Intended to be subjected to tensile loading in service, the representative joint assembly 10 comprises a joint housing or socket member 12 and a ball stud 14 coupled to each other, as will be detailed hereafter, for relative angular displacement. The joint housing 12 takes the form of a rigid, hollow cylinder, having an opening 16 at one end and a closure plate 18 closing another end. the opening 16, through which the ball stud 14 extends into the joint housing 12, is beveled to permit greater angular motion of the ball stud with respect to the housing.

The ball stud 14 has a greater diameter portion herein shown as a sphere-segmental head 20 on its extreme end received in the joint housing 12. The head 20 provides a planar, annular shoulder 22 disposed at right angles with the axis of the ball stud 14 and directed toward the opening 16 of the joint housing 12.

Concentrically surrounding that part of the ball stud 14 which is received in the housing 12 is a sheet-metal shell 24 shaped like a segment of a sphere between two parallel planes. The shell 24 has an inturned annular rim 26 at one end, directed toward the closure plate 18. The rim 26 of the shell 24 is opposed to the shoulder 22 of the ball stud 14 and is spaced therefrom axially of the joint assembly 10. The inside diameter of the rim 26 is greater than the diameter of the ball stud 14, so that the rim, though held close to the circumference of the ball stud, is nevertheless out of contact therewith. The other end of the shell 24 likewise surrounds the ball stud 14 with clearance.

A one-piece bushing 28 of an elastomer fills the complete space between ball stud 14 and shell 24 as well as the gap between ball stud shoulder 22 and shell rim 26. The reference numeral 30 denotes that part of the elastomeric bushing 28 which fills the space between shoulder 22 and rim 26. A plastic bearing 32 is also mounted within the housing 12 so as to nearly completely envelope the ball stud head 20 and shell 24 in sliding engagement therewith, allowing the angular motion of the ball stud 14 relative to the housing 12.

Figure 2:
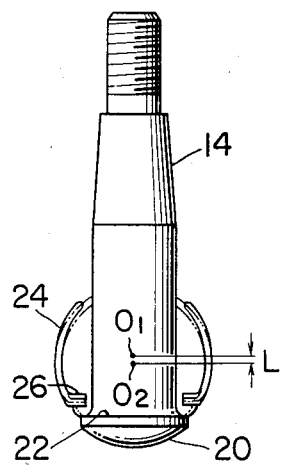
FIG. 2 is an elevation of the ball stud of the joint assembly of FIG. 1, showing its position with respect to that of the shell depicted in the phantom outline.

Preferably, at least the bushing part 30 between ball stud shoulder 22 and shell rim 26 should be precompressed for the optimum performance characteristics of this joint assembly 10. FIG. 2, which shows only the ball stud 14 and shell 24 of the joint assembly 10, is explanatory of how to apply precompression to the bushing part 30. The bushing 28 is to be molded in place between the ball stud 14 and shell 24, as will be detailed subsequently. It will be observed from FIG. 2 that the ball stud head 20 and shell 24 are shaped like complementary segments of a sphere. Before and during the molding of the bushing 28, the geometrical center 01 of the sphere-segmental shell 24 and the geometrical center 02 of the sphere-segmental ball stud head 20 are offset from each other in the axial direction of the ball stud 14. The center 01 is displaced from the center 02 in a direction away from the ball stud head 20. The center 01 is to be brought into registration with the center 02 in mounting the ball stud 14 and shell 24 within the housing 12 following the completion of the molding of the bushing 28. The bushing part 30 can then be compressed to an extent depending upon the initial displacement L of the center 01 from the center 02.

In the use of the ball and socket joint assembly 10 of the foregoing construction, the sliding surfaces of the bearing 32 and shell 24 will develop wear to such an extent that the joint assembly might show looseness. However, the precompressed bushing part 30 will take up such wear, causing displacement of the shell 24 away from the ball stud head 20, and so will reduce looseness to a minimum.

Figure 3:
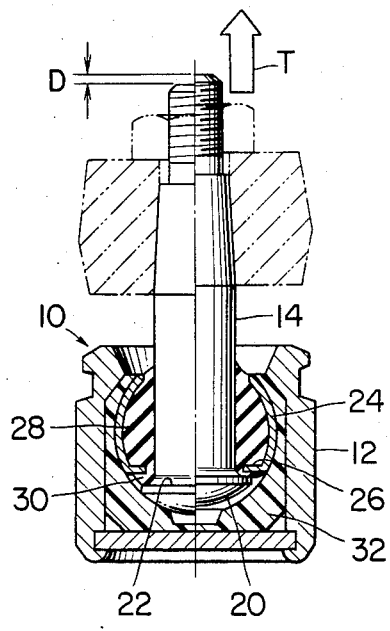
FIG. 3 is a view similar to FIG. 1 except that the joint assembly is shown divided into right and left halves, with the left half of the joint assembly being shown in a normal state, and the right half being shown in a state under tensile load, in order to clearly illustrate the degree of axial displacement of the ball stud relative to the joint housing under tensile load.

Further, as illustrated in FIG. 3, the axial displacement D of the ball stud 14 away from the joint housing 12 under tensile load T will be much less than that of the comparable prior art. This is also due to the prestressed bushing part 30 caught between ball stud shoulder 22 and shell rim 26. Under transverse load, too, the resulting lateral displacement of the ball stud 14 can be minimized as the inner edge of the shell rim 26 is held close to the shank portion of the ball stud 14 via the one-piece bushing 28.

Figure 4:
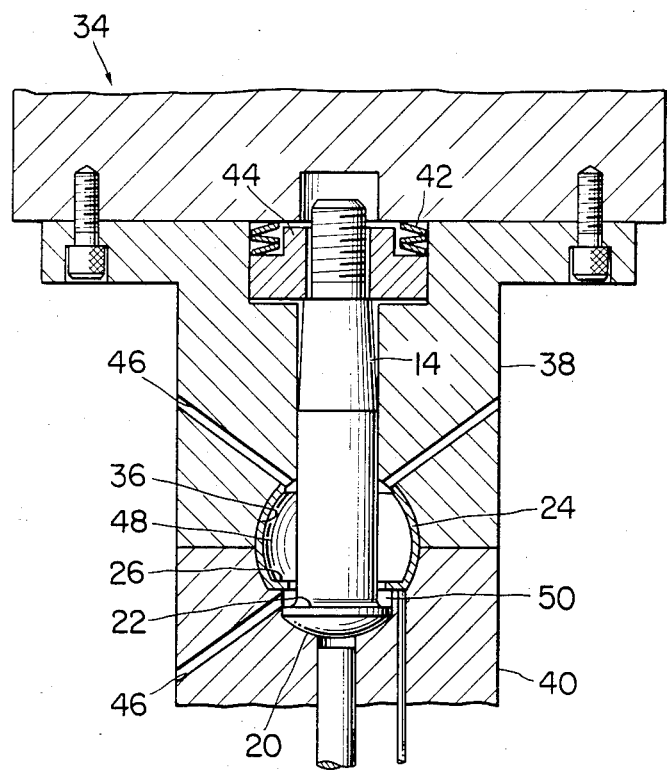
FIG. 4 is a section through a molding machine for use in the fabrication of the joint assembly of FIGS. 1 through 3, the machine being shown together with the ball stud and shell of the joint assembly mounted in position therein for molding the one-piece bushing therebetween.

FIG. 4 is an illustration of an example of molding machine 34 suitable for use in molding the one-piece elastomeric bushing 28 in situ between ball stud 14 and shell 24 in accordance with the method of this invention. This figure shows the ball stud 14 and shell 24 mounted in cavities 36 in a pair of mold sections 38 and 40. Both ball stud 14 and shell 24 can be both fabricated in largely customary ways. For example, the ball stud 14 may be forged, and screw threads may be cut as required. The shell 24, on the other hand, can be formed by causing the plastic deformation of a required length of metal tube into the sphere-segmental shape defined previously. One end of the thus deformed tube may then be bent inwardly to form the rim 26 at right angles with its axis.

It will be seen from FIG. 4 that the ball stud 14 has its sphere-segmental head 20 held against the bottom of the cavity in the lower mold section 40 by the force of a compression spring 42 exerted thereon via a retainer 44. The shell 24 is caught snugly in a matching sphere-segmental portion of the cavities 36 defined by both mold sections 38 and 40. The relative positions of the ball stud 14 and shell 24 are as set forth above with reference to FIG. 1. Further, as has been stated in connection with FIG. 2, the center 01 of the shell 24 is offset the distance L from the center 02 of the ball stud head 20 in the direction away from the head.

An elastomer is introduced in a fluid state into the mold cavities by way of sprues 46, thereby filling a space 48 between ball stud 14 and shell 24 and a gap 50 between ball stud head 20 and shell rim 26. The molding may be vulcanized and further firmly united with the ball stud 14 and shell 24 as by baking or cementing, thereby completing the one-piece elastomeric bushing 28 integrally joining the ball stud and shell.

Then the ball stud and shell combination is inserted in the plastic bearing 32, and these are mounted altogether in the housing 12 through its end to be closed by the closure plate 18. In thus mounting the ball stud and shell combination, the relative positions of the ball stud 14 and shell 24 should be corrected in their axial direction so that the shell center 01 comes into register with the ball stud head center 02, thereby applying a precompression to the bushing part 30 between ball stud shoulder 22 and shell rim 26. The manufacture of the joint assembly 10 can be completed as the closure plate 18 is mounted to the end of the housing 12 and held fast thereon as by peening or otherwise clinching the end of the housing over the marginal edges of the plate.

FIG. 5 is explanatory of a slightly modified method of fabricating the ball and socket joint assembly 10 of FIGS. 1 through 3. The reference numeral 52 in this figure generally denotes a press for forming the sphere-segmental shell 24 in position on the ball stud 13. The shell 24 is herein shown as a substantially tubular preform 24', only with its lower end porton rounded and formed with the inturned annular rim 26. This shell preform 24' and the ball stud 14, together with the elastomeric bushing 28 already molded and vulcanized therebetween, are mounted in a cavity 54 in the die 56 of the press 52. A punch 58 having a sphere-segmental cavity 60 is to be lowered onto the die 56 to press the exposed upper portion of the preform 24' into the desired sphere-segmental shape and, at the same time, to give a precompression to the elastomeric bushing 28 therein. The degree of precompression depends upon the initial size of the bushing 28.

Shown in FIG. 6 is a slight modification of the joint assembly 10 of FIGS. 1 through 3. Generally labeled 110, the modified joint assembly has a plastic bearing 132 which makes sliding engagement only with the head 20 of the ball stud 14 and a neighboring part of a shell 124, so that this shell makes direct sliding contact with the housing 12 at and adjacent its open end. Unlike the shell 24 of the joint assembly 10, which is metal made, the shell 124 is molded of a wearproof, high strength plastic, preferably that reinforced with fibers or filaments. The joint assembly 110 also differs from the previous embodiment in that its closure plate 118 is pressfitted in grooves 62 cut in the housing 12. The other details of configuration of this joint assembly 110 can be as set forth above in connection with the joint assembly 10. It will also be seen that the joint assembly 110 can be manufactured by essentially the same method as the joint assembly 10 except that the shell 124 is molded of a plastic.

In FIG. 7 the joint assembly of this invention is shown adapted for use on a tie rod end of an automotive steering linkage, in which application the joint assembly must withstand both tensile and compressive stresses. The shell of this joint assembly 210 is split into a pair of halves 224a and 224b along a plane normal to the axis of the joint assembly. As in the foregoing embodiments, however, the pair of shell halves 224a and 224b when taken together is shaped like the segment of a sphere included between two parallel planes. The upper shell half 224a, close to the opening 16 in a joint housing 212 in one piece with the tie rod 64, has an inturned annular rim 226a on its upper axial end. The lower shell half 224b is likewise provided with an inturned annular rim 226b on its end directed toward the closure plate 18 of the joint housing 212.

The ball stud 214 of this joint assembly 210 is provided with the greater diameter portion in the form of a circumferential rib 220 located some distance from the extreme end of the ball stud and disposed adjacent the opening 16 of the joint housing 212. The rib 220 provides an annular shoulder 222a directed toward the housing opening 16 and opposed to the rim 226a of the upper shell half 224a. Further the ball stud 214 has an extension 66 of reduced diameter protruding from its end toward the closure plate 18 of the housing 212 and extending with clearance through the rim 226b of the lower shell half 224b. The reduced diameter extension 66 provides another annular shoulder 222b at or adjacent the end of the ball stud 214. This shoulder 222b is opposed to and axially spaced from the rim 226b of the lower shell half 224b.

A one-piece elastomeric bushing 228 fills the complete space between the ball stud 214 and the pair of shell halves 224a and 224b, as well as the gaps between ball stud shoulder 222a and upper shell half rim 226a and between ball stud shoulder 222b and lower shell half rim 226b. Those parts 230a and 230b of the bushing 228 which fill the gaps between ball stud shoulders 222a and 222b and shell rims 226a and 226b are precompressed axially of the ball stud 214 at the time of the assemblage of this joint assembly 210. The plastic bearing 232 nearly completely envelopes the ball end of the ball stud 214.

It will now be clear that the joint assembly 210 can effectively absorb vibrations and impacts under both compressive and tensile loads in its axial direction, with a minimal displacement of the ball stud 214 relative to the housing 212. This joint assembly 210 can also be fabricated by essentially the same method as the joint assembly 10 of FIGS. 1 through 3.

It will of course be understood that various changes may be made in the form, details, arrangements, and proportions of the parts of the illustrated joint assemblies 10, 110 and 210, as well as in the above disclosed specific methods of their manufacture, without departing from the scope of this invention. For example, the closure plate of the housing may be dispensed with to open the other end of the housing, and another stud may extend through the other end coaxially with, and in a direction opposite to, the ball stud.

What is claimed is:

1. A resilient ball and socket joint construction, comprising
    (a) a housing having an open end and another end;
    (b) a ball stud extending into the housing through the open end thereof and having a greater diameter portion than the remainder of the ball stud, greater diameter portion being located within the housing, the greater diameter portion providing an annular shoulder at one axial end thereof;
    (c) a sphere-segmental shell disposed within the housing and coaxially surrounding the ball stud with a spacing therebetween, the shell having an inturned annular rim in the form of a flange at one axial end thereof in an opposed relation to the shoulder of the ball stud;
    (d) a one-piece elastomeric bushing filling the space between the ball stud and the shell and a gap between the shoulder of the ball stud and the inturned rim of the shell, the bushing substantially integrally joining the ball stud and the shell; and
    (e) a bearing within the housing supporting the ball stud so as to allow angular displacement thereof relative to the housing.

2. The resilient ball and socket joint construction as set forth in claim 1, wherein that portion of the elastomeric bushing which fills the gap between the shoulder of the ball stud and the inturned rim of the shell is precompressed in the axial direction of the ball stud.

3. The resilient ball and socket joint construction as set forth in claim 2, wherein that portion of the elastomeric bushing which fills the space between the ball stud and the shell is also precompressed.

4. The resilient ball and socket joint construction as set forth in claim 1, wherein the shoulder of the ball stud and the inturned rim of the shell are both at right angles with the axis of the ball stud.

5. The resilient ball and socket joint construction as set forth in claim 1, wherein the greater diameter portion of the ball stud is in the form of a sphere-segental head on the end of the ball stud held opposite the other end of the housing.

6. The resilient ball and socket joint construction as set forth in claim 5, wherein the annular shoulder of the ball stud is directed toward the open end of the housing, and wherein the inturned rim is formed on that axial end of the shell which is directed toward the other end of the housing.

7. The resilient ball and socket joint construction as set forth in claim 1, wherein the greater diameter portion of the ball stud is in the form of a circumferential rib on the ball stud.

8. The resilient ball and socket joint construction as set forth in claim 7, wherein the circumferential rib of the ball stud is disposed adjacent the open end of the housing, with the annular shoulder directed toward the open end of the housing, and wherein the inturned rim is formed on that axial end of the shell which is directed toward the open end of the housing.

9. The resilient ball and socket joint construction as set forth in claim 8, wherein the ball stud is adapted to provide a second annular shoulder adjacent its end held opposite the other end of the housing, wherein the shell has a second inturned annular rim on the other axial end thereof in an opposed relation to the second shoulder of the ball stud, and wherein the one-piece elastomeric bushing further fills a gap between the second shoulder of the ball stud and the second inturned rim of the shell.

10. The resilient ball and socket joint construction as set forth in claim 9, wherein those portions of the elastomeric bushing which fill the gap between the first mentioned shoulder of the ball stud and the first mentioned rim of the shell and the gap between the second shoulder of the ball stud and the second rim of the shell are both precompressed in the axial direction of the ball stud.

11. The resilient ball and socket joint construction as set forth in claim 9, wherein the shell is split into a pair of halves along a plane normal to the axis of the ball stud.

12. The resilient ball and socket joint of claim 1 wherein an inside diameter of the rim is greater than the diameter of the ball stud.

* * * * *